No. 748,301. PATENTED DEC. 29, 1903.
A. W. NICHOLLS.
ATTACHING SOCKET FOR GAS OR AIR TUBING.
APPLICATION FILED JUNE 19, 1903.
NO MODEL.
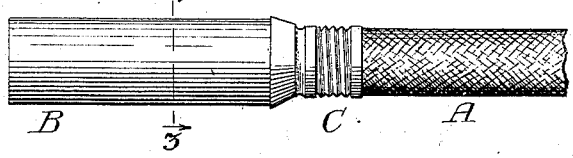
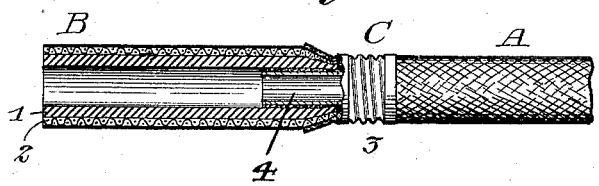
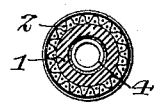
Witnesses:
Herman M. Krueger.
Louis M.␣␣␣␣␣␣
Inventor:
Albert W. Nicholls
by Chas. G. Page
Atty.

No. 748,301. Patented December 29, 1903.

UNITED STATES PATENT OFFICE.

ALBERT W. NICHOLLS, OF CHICAGO, ILLINOIS.

ATTACHING-SOCKET FOR GAS OR AIR TUBING.

SPECIFICATION forming part of Letters Patent No. 748,301, dated December 29, 1903.

Application filed June 19, 1903. Serial No. 162,162. (No model.)

*To all whom it may concern:*

Be it known that I, ALBERT W. NICHOLLS, a citizen of the United States, residing at Chicago, in the county of Cook and State of Illinois, have invented a certain new and useful Improvement in Attaching-Sockets for Gas or Air Tubes, of which the following is a specification.

My invention relates to sockets adapted for removably attaching flexible tubes for gas or compressed air to nipples on gas-stoves or the like and comprising an elastic tubular structure into which the nipple is wedged by forcing the socket upon it, an illustration of a socket of such character being, for example, afforded by patent to J. J. Vautier, No. 530,563, December 11, 1894, in which the elastic socket is thickened between its ends. I find, however, that in practice such elastic rubber sockets will in the course of time almost invariably split, owing to the fact that the curving of the rubber does not end with the vulcanization involved in manufacture, and that in time the rubber will become non-elastic and brittle.

Objects of my invention are to economize in rubber, to avoid objectionable splitting, to permit compounded rubber to be used in place of pure rubber, and to provide a simple, durable, and economical construction.

In the accompanying drawings, Figure 1 is a side view of an attaching-socket combined with a flexible air or gas supply tube and understood to embody my invention. Fig. 2 is a similar view with the socket in central longitudinal section. Fig. 3 is a cross-section on line 3 3 in Fig. 1.

A indicates a portion of an ordinary flexible tube for compressed air or gas.

B denotes my improved attaching-socket, and C refers to a sleeve or ferrule connection between the socket and the tube.

The socket B is constructed with an inner tubular core 1, of rubber, and a next outer tubular reinforcing and restraining layer 2, of any suitable fibrous material, either wound or woven, but preferably the latter, and this outer restraining layer can be and preferably is given a finishing coat of rubber or the like. The tube A and ferrule connection C can be of any ordinary or suitable construction. As illustrated, connection between the tube and the socket is made by an outer metal sleeve 3 and an inner hollow mandrel or supporting-sleeve 4.

The socket B is suitably flexible and can be fitted upon the nipple of a gas-stove or other article to be supplied and will form a tight joint therewith, while at the same time the restraining layer of fibrous material will prevent split of the tubular rubber core, and thereby greatly prolong the life of the socket. This arrangement also permits the tubular rubber core to be made of compounded rubber in place of pure rubber, thereby lessening first cost and at the same time providing a socket having a much longer life than a socket of pure rubber. The restraining layer 2 also strengthens the connection between sleeve 3 and the socket B and tends to prevent the two from being pulled apart during use.

What I claim as my invention is—

A socket for removably attaching flexible tubes for gas or compressed air to nipples on gas-stoves and the like, comprising an elastic, tubular rubber core 1, adapted to receive the nipple, an outer restraining layer 2 of fibrous material inclosing the tubular rubber core and in contact therewith from end to end of said core, in combination with a flexible gas or air tube and a ferrule connecting such tube with the socket, an end portion of the outer restraining layer being engaged by the ferrule which thus holds together the socket and the tube.

ALBERT W. NICHOLLS.

Witnesses:
CHARLES G. PAGE,
OTTILIE C. FREIBERG.